J. W. LEITCH.
CONCENTRATING SULFURIC ACID.
APPLICATION FILED DEC. 14, 1915.

1,257,894.

Patented Feb. 26, 1918.
2 SHEETS—SHEET 1.

Witnesses:

Inventor
John W. Leitch
by
Attorney

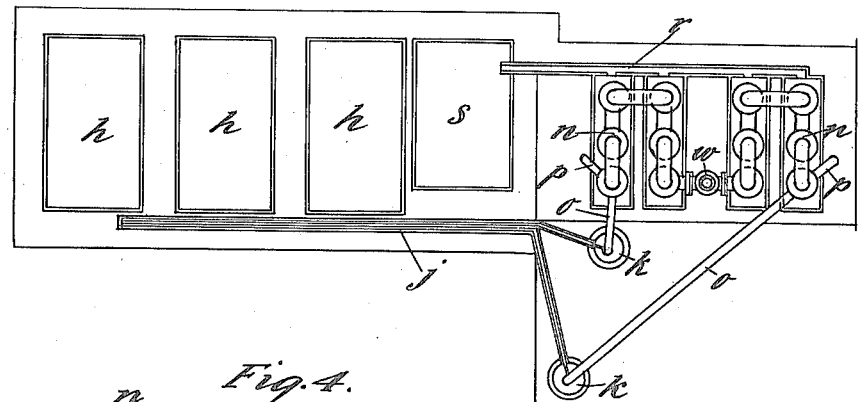
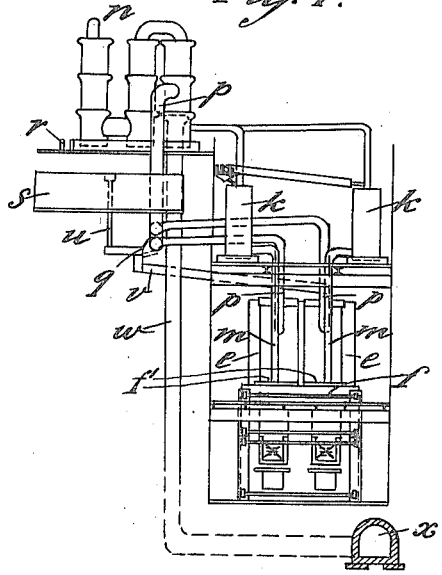
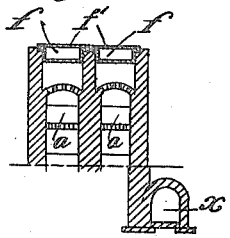
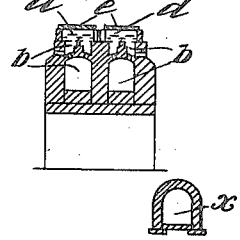
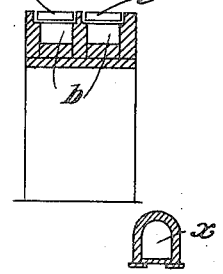

UNITED STATES PATENT OFFICE.

JOHN W. LEITCH, OF HUDDERSFIELD, ENGLAND.

CONCENTRATING SULFURIC ACID.

1,257,894. Specification of Letters Patent. Patented Feb. 26, 1918.

Application filed December 14, 1915. Serial No. 66,784.

*To all whom it may concern:*

Be it known that I, JOHN WALKER LEITCH, a subject of the King of Great Britain, residing in Huddersfield, England, have invented certain new and useful Improvements in Concentrating Sulfuric Acid, of which the following is a specification.

It has been proposed to concentrate sulfuric acid by the cascade method in two stages, a preliminary stage, in the open flue or above the furnace, and a final stage in a series of basins arranged in a closed chamber from which the products of evaporation are withdrawn. It has also been proposed that such closed chamber be constructed as a muffle about which hot gases may be circulated. Where high concentration is required it has been proposed to carry out the final step of the concentration in an iron basin, so that it may be more correct to describe such a process as a three stage process.

The present invention relates to a three stage concentration process similar to that described adapted for highly concentrating sulfuric acid continuously in large quantities.

It consists in providing a plant which while occupying a comparatively small space gives a large output, which will work constantly without having to be frequently cleaned or examined, and which is readily accessible for cleaning or examination when such is necessary.

If sulfuric acid, whether fresh acid or waste acid, is to be concentrated to 96–98 per cent. strength as a continuous operation in iron vessels these must be kept at a high temperature which leads to the distillation of a considerable proportion of the acid in a diluted state. This loss by distillation can be diminished if the acid run into the iron vessel has a strength of not less than 85–90 per cent.

It is impracticable to concentrate the acid to 85–90 per cent. in iron vessels arranged in cascade because acid below this strength attacks iron too readily. Lead also is not suitable for bringing the acid to this concentration. According to my invention therefore, in a three stage cascade process similar to that described, I use pans of lead or other material suitable for concentrating the acid to 75–80 per cent. strength in known manner, then vessels adapted to resist the attack of acid between 75–80 and 85–90 per cent. to concentrate the acid to the latter strength and finally highly heated iron vessels to concentrate the acid to the desired strength. The vessels intermediate between the lead pans, which are preferably open, and the iron pans, which are preferably inclosed, may be of silica, glass, porcelain, or one of the known iron alloys, such as tantiron, duriron, ironac or the like capable of resisting acid of the strength in question; and these vessels are inclosed for recovery of dilute acid evaporating therefrom.

The invention will be described with reference to the accompanying drawings which illustrate a complete concentration plant constructed according to my invention.

Fig. 3 is a plan of the upper parts of the apparatus.

Figure 1:
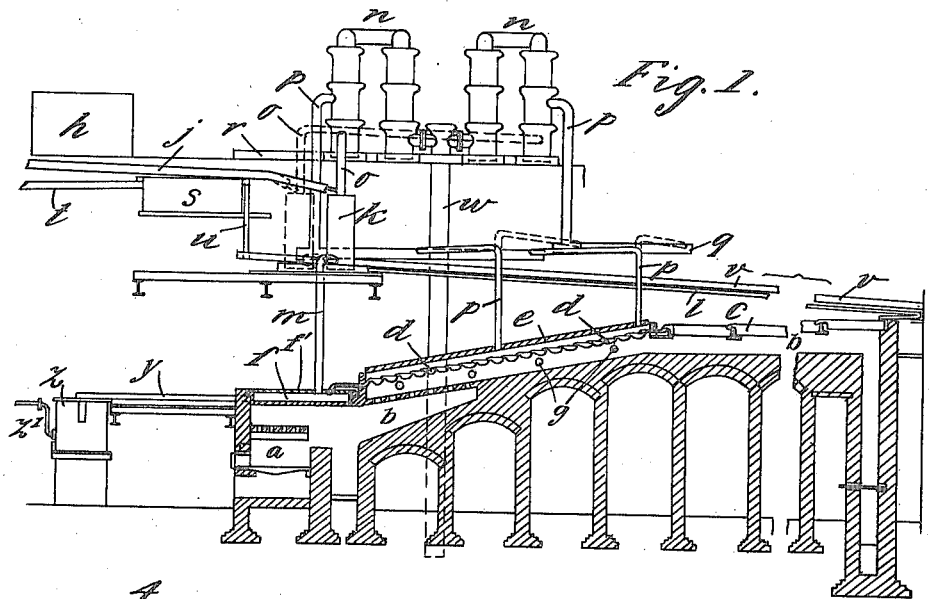
Figure 1 is a longitudinal section of the apparatus on line 1—1 of Fig. 2.
Figure 2:
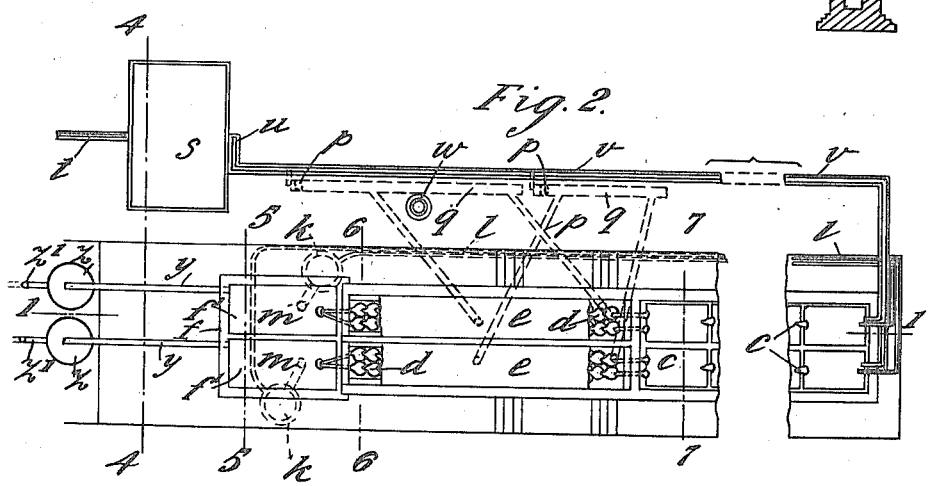
Fig. 2 is a sectional plan of the lower part of the apparatus.

Figs. 4, 5, 6 and 7 are respectively sections on lines 4—4, 5—5, 6—6 and 7—7 of Fig. 2.

The plant is heated from a furnace $a$ the combustion products from which ascend the parallel flues $b$. Thus in well known manner securing a direct counterflow of the hot gases to that of the acid, under the concentrating means.

The lead pans $c$ are set over the upper parts of these flues and are arranged in cascade as shown, the acid to be concentrated, preferably preheated to a temperature of from 100° C. to 120° C., as described below, being run into the highest pan. The steam from these pans may be allowed to escape into the atmosphere.

The covering of the lower part of each flue $b$ supports in known manner the silica basins $d$ also arranged in cascade. The acid from the lowest lead pan $c$, preferably at a temperature of from 135° C. to 150° C. flows into the highest of these basins $d$, the number and temperature of which is such that the acid has a strength of 85–90 per cent. and preferably a temperature of from 200° C. to 215° C. by the time it leaves the lowest basins. The basins are inclosed by a cover $e$ and the steam containing sulfuric acid and any other acid evolved from the hot sulfuric acid, is drawn from the space confined by the cover through a suitable condenser as hereinafter described.

The lowest silica basins discharge into pans $f$ of cast iron or one of the known iron alloys, such as above alluded to, set over the furnace $a$. Here the acid flows to the outlet becoming concentrated to 96–98 per cent. The temperatures maintained in this pan preferably range from 260° C. to 285° C. at the inlet to from 300° C. to 325° C. at the outlet.

The sight holes $g$ in the flues $b$ may serve for the admission of air for controlling the temperature.

At a suitable level above the uppermost of the lead pans $c$ are arranged one or more reservoirs $h$ to receive the weak acid to be concentrated. Three such reservoirs as shown in Fig. 3 are preferably provided, so that while one tank is being filled a second can be emptied and a third is always ready as a stand-by. Ducts $j$ lead the acid from the reservoirs $h$ to one or more towers $k$ down which the acid flows, and in which it is preheated before being fed to the lead pans $c$. The acid having passed down the tower or towers $k$ is then led by further ducts $l$ to the lead pans $c$.

The iron pan $f$ in which final concentration takes place is covered by a hood or other suitable cover $f'$ which collects the hot vapors arising from the pan $f$ and they are led from such cover to the tower $k$ by means of the pipe $m$. The towers $k$ are preferably arranged more or less directly over the iron pans $f$ and the pipes $m$ are made as short as possible to prevent loss of heat and condensation. A separate tower $k$ is preferably provided as shown for each complete unit or cascade of the plant. The hot vapors from the pan $f$ heat the dilute acid falling through the tower $k$ and at the same time a large proportion of the acid in the vapor is recovered by being condensed in the dilute acid and passes again through the concentrating plant.

The cover $f'$ of the pan $f$ may be of any suitable form or construction. As shown it consists of a slab or plate of suitable resistant material laid upon the rim of the pan.

At a suitable level, preferably above that of the concentration plant, say for instance on the same level or platform as the reservoirs $h$, are arranged one or more condensers $n$. The condensers are shown in the drawings, one for each unit or cascade of the plant and this is the preferable arrangement. The condensers $n$ may be of any suitable construction or arrangement. As shown they each comprise six towers through which the vapors are passed in succession. Pipes $o$ connect the towers $k$ with the first towers of the condensers, by means of which any uncondensed vapors passing from the towers are led to the condensers.

In addition to the vapors from the towers $k$ those arising from the second stage of concentration in the silica basins $d$ are also led directly to the condensers $n$. For this purpose one or more pipes $p$ are arranged in the cover $e$ over the basins $d$ by which the vapors therefrom are led to the condensers. The vapors preferably pass through an inclined pipe $q$ which collects any condensate and delivers it to a reservoir or to one of the ducts leading to the pans $c$ so that it can be again passed through the apparatus and the acid recovered, or to any other position desired.

The condenser towers are arranged over a water-tight tray into which they dip in such a manner that the condensate in the tray forms a seal to close them at the bottom. Any vapor condensed in the condenser towers falls down them into the tray and is led away by the overflow ducts $r$ into the collecting reservoir $s$. The dilute acid in this reservoir may be led away by the duct $t$ to any position where it may be wanted or it may overflow by the pipe $u$ into the duct $v$ by which it is led to the pans $c$. Or the reservoir $s$ may be dispensed with and the dilute acid from the condensers be fed directly into one of the ducts leading to the pans $c$. As stated above it is preferable that the condensers should be raised to permit of the condensate flowing down to the pans $c$. Means for raising the condensate to this level must otherwise be provided when it is to be passed again through the concentrating plant. Any vapors passing from the condensers $n$ are led by the pipe $w$ into the main flue $x$ of the apparatus.

The covers $e$, $f'$ of both the silica basins and of the iron pans are preferably made so as to be easily removable to facilitate the cleaning of the plant.

The acid in the iron pan $f$ is maintained at any suitable depth but preferably not more than 4 or 5 inches and overflows by a duct $y$ into a cooling vessel $z$ from which it passes to suitable storage tanks or the like by the pipe $z'$ which is preferably connected near the bottom of the cooling vessel $z$, and rises to such a height that the vessel $z$ is normally maintained full, but cannot overflow.

Having thus described the said invention and the best means I know of carrying the same into practical effect, I claim:—

1. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; and covered iron pans adapted to receive the concentrated acid and further concentrate it to 96–98 per cent. strength.

2. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; covered iron pans adapted to receive the concentrated acid and further concentrate it to 96–98 per cent. strength; and means for collecting the hot vapors resulting from the second and the final stages of concentration.

3. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; covered iron pans adapted to receive the concentrated acid and further concentrate it to 96–98 per cent. strength; and means for preheating the dilute acid by the action of the hot gases arising from the concentration of the acid, and at the same time condensing and recovering a portion of the acid from said hot gases.

4. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; covered iron pans adapted to receive the concentrated acid and further concentrate it to 96–98 per cent. strength; a tower for preheating the dilute acid by the intermixture of the hot gases, arranged at a level above the concentrating apparatus and at a point approximately directly above the final concentration pan; a duct adapted to lead the hot vapors from said final concentration pan to said tower; and a duct leading the preheated acid to the first pan of the concentration cascade.

5. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; covered iron pans adapted to receive the concentrated acid and further concentrate it to 96–98 per cent. strength; a tower through which the dilute acid and the hot vapors from final concentration are passed; and a condenser in which the vapors from the second stage of concentration and those passing from the tower are treated.

6. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; covered iron pans adapted to receive the concentrated acid and further concentrate it to 96–98 per cent. strength; a tower for preheating the dilute acid by the intermixture of the hot gases arranged at a level above the concentrating apparatus and at a point approximately directly above the final concentration pan; a duct adapted to lead the hot vapors from said final concentration pan to said tower; a condenser arranged at a level above that of the concentrating plant; a duct communicating between the top of the tower and the condenser and adapted to conduct any gases passing from the tower to the condenser; and one or more ducts communicating between the secondary concentration chamber and the condenser and adapted to conduct the hot vapors formed in said chamber to the condenser.

7. Apparatus for continuously concentrating sulfuric acid to a strength of 96–98 per cent., comprising open pans adapted to receive the dilute acid and preliminarily concentrate it to about 75–80 per cent. strength; open silica basins arranged in a closed chamber and adapted to receive the preliminarily-concentrated acid and to concentrate it to about 85–90 per cent. strength; iron pans adapted to receive the concentrated acid and further concentrate it to 96–98 per cent. strength; and means for closing the chambers of the second and third stages of concentration, comprising easily removable covers to facilitate the cleaning of the plant and the making of repairs.

In testimony whereof I have signed my name to this specification in the presence of two subscribing witnesses.

JOHN W. LEITCH.

Witnesses:
 WM. MCGEE,
 F. CHAMBERS.